US007915375B2

(12) United States Patent
Pawlow et al.

(10) Patent No.: US 7,915,375 B2
(45) Date of Patent: Mar. 29, 2011

(54) METATHESIS INTERPOLYMERS HAVING TERMINAL FUNCTIONAL GROUP(S)

(75) Inventors: James Pawlow, Akron, OH (US); William Hergenrother, Akron, OH (US)

(73) Assignee: Firestone Polymers, LLC

( * ) Notice: Subject to any disclaimer, the term of this patent is extended or adjusted under 35 U.S.C. 154(b) by 34 days.

(21) Appl. No.: 12/224,632

(22) PCT Filed: Mar. 1, 2007

(86) PCT No.: PCT/US2007/005323
§ 371 (c)(1),
(2), (4) Date: Dec. 5, 2008

(87) PCT Pub. No.: WO2007/100889
PCT Pub. Date: Sep. 7, 2007

(65) Prior Publication Data
US 2009/0187001 A1   Jul. 23, 2009

Related U.S. Application Data

(60) Provisional application No. 60/777,970, filed on Mar. 1, 2006.

(51) Int. Cl.
*C08G 65/38*   (2006.01)
*C08G 2/00*    (2006.01)
(52) U.S. Cl. .................. 528/271; 526/217; 526/218.1; 528/176

(58) Field of Classification Search .................. 502/152, 502/155; 526/217, 218.1; 528/176
See application file for complete search history.

(56) References Cited

U.S. PATENT DOCUMENTS

| | | | | | |
|---|---|---|---|---|---|
| 3,867,361 | A | * | 2/1975 | Calderon et al. | 526/140 |
| 3,891,816 | A | * | 6/1975 | Scott et al. | 525/195 |
| 5,621,047 | A | * | 4/1997 | Nubel et al. | 525/247 |
| 5,731,383 | A | * | 3/1998 | Nubel et al. | 525/297 |
| 6,107,237 | A | * | 8/2000 | Wagener et al. | 502/240 |
| 6,465,590 | B1 | * | 10/2002 | Maughon et al. | 526/264 |
| 2003/0050411 | A1 | * | 3/2003 | Gaynor et al. | 526/90 |
| 2005/0176906 | A1 | * | 8/2005 | Maughon et al. | 526/264 |
| 2006/0173145 | A1 | * | 8/2006 | Pawlow et al. | 526/171 |

FOREIGN PATENT DOCUMENTS

| | | | |
|---|---|---|---|
| WO | WO9604289 | * | 2/1996 |
| WO | 2006094060 | | 9/2006 |

OTHER PUBLICATIONS

International Search Report and Written Opinion of International Appl. No. PCT/US2007/005323, dated Jul. 2, 2007.

* cited by examiner

*Primary Examiner* — Terressa M Boykin
(74) *Attorney, Agent, or Firm* — Meredith E. Hooker; Arthur Reginelli

(57) ABSTRACT

The disclosure relates to unsaturated metathesis interpolymers having at least one or more specified terminal functional groups. The interpolymers are prepared by metathesis polymerization, and are selected from 1,5-cyclooctadiene and cyclopentene, 1,5-cyclooctadiene and cyclooctene, and cyclooctene and cyclopentene interpolymers.

15 Claims, No Drawings

METATHESIS INTERPOLYMERS HAVING TERMINAL FUNCTIONAL GROUP(S)

This application claims the benefit of U.S. Provisional application No. 60/777,970, filed Mar. 1, 2006, and PCT Application No. PCT/US2007/005323, filed Mar. 1, 2007, which are incorporated herein by reference in their entirety.

FIELD OF THE INVENTION

This invention relates to unsaturated interpolymers prepared by metathesis polymerization, having at least one or more terminal functional groups.

BACKGROUND OF THE INVENTION

Metathesis polymerization is a synthetic route utilized to prepare unsaturated linear polymers and interpolymers with known macrostructure and known microstructure. The microstructure of the resulting polymer is directly derived from the structural composition of the monomer(s) utilized in the polymerization.

Interpolymers are a class of macromolecule constructed using two or more different monomer units or polymers. Examples of interpolymers include copolymers, terpolymers, block polymers, and graft polymers. Interpolymers often have characteristics and properties that are a hybrid of its components. The preparation of interpolymers allow for the expansion of available polymer characteristics and for the accessibility of physical properties inaccessible via homopolymers.

Functional polymers are useful and technologically important materials. The presence of functional groups is utilized to modify the physical characteristics of polymers in which groups are incorporated. Polymers with terminal functional groups contain reactive sites at the end of the polymer chain. As a result, polymers with terminal functional groups are highly desired and useful to prepare block polymers and other morphological structures.

SUMMARY OF THE INVENTION

The present invention relates to interpolymers prepared by metathesis polymerization that are characterized by having at least one or more terminal functional groups.

The terminal functional group that is usable herein is a group selected from hydroxyl, carboxylic acid, ester, carbonate, cyclic carbonate, anhydride, cyclic anhydride, lactone, amine, amide, lactam, cyclic ether, ether, aldehyde, thiazoline, oxazoline, phenol, melamine, and mixtures thereof. In one embodiment, the terminal functional group is a group selected from hydroxyl, carboxylic acid, and ester, and mixtures thereof.

DETAILED DESCRIPTION OF ILLUSTRATIVE EMBODIMENTS

The present invention relates to unsaturated interpolymers prepared by metathesis polymerization that are characterized by having at least one or more terminal functional groups. In one embodiment, the unsaturated metathesis interpolymers may be further characterized as having less than 2% pendant vinyl groups. In another embodiment, the unsaturated metathesis interpolymers may be further characterized as having from about 5 to about 25 double bonds per 100 carbon atoms in the polymer chain.

The terminal functional group that is usable herein is a group selected from hydroxyl, carboxylic acid, ester, carbonate, cyclic carbonate, anhydride, cyclic anhydride, lactone, amine, amide, lactam, cyclic ether, ether, aldehyde, thiazoline, oxazoline, phenol, melamine, and mixtures thereof. In one embodiment, the terminal functional group is a group selected from hydroxyl, carboxylic acid, and ester, and mixtures thereof.

1. General

The unsaturated polymers employed in the present invention are metathesis-synthesized interpolymers that have at least one or more terminal functional groups.

The terminal functional group that is suitable for use herein is a group selected from hydroxyl, carboxylic acid, ester, carbonate, cyclic carbonate, anhydride, cyclic anhydride, lactone, amine, amide, lactam, cyclic ether, ether, aldehyde, thiazoline, oxazoline, phenol, melamine, and mixtures thereof. In one embodiment, the terminal functional group is a group selected from hydroxyl, carboxylic acid, and ester, and mixtures thereof. In one or more embodiments, olefins such as cycloolefins and alpha, omega dienes, are polymerized by employing a metathesis catalyst to form the unsaturated polymer. The metathesis reaction may be ring opening metathesis polymerization (ROMP), acyclic diene metathesis polymerization (ADMET), or the like. In certain embodiments, metathesis-synthesized high molecular weight polymers are modified (e.g., molecular weight reduction) by employing metathesis catalysts to provide unsaturated polymers useful for practicing the present invention. A functional olefin (i.e., an olefin including one or more functional groups) is employed to yield unsaturated functional interpolymers or protected functional interpolymers. The unsaturated polymers comprise one or more functional groups. By employing metathesis polymerization techniques, the resulting interpolymer has from about 5 to about 25 double bonds per 100 carbon atoms in the polymer chain.

2. Catalyst

Any metathesis catalysts are useful in practicing this invention. In one or more embodiments, the metathesis catalyst includes a transition metal carbene complex. Suitable transition metal carbene complexes include a positively charged metal center (e.g. in the +2, +4, or +6 oxidation state) that is penta- or hexa-coordinated. Exemplary transition metals include transition metals from Groups 3 to 12 of the Periodic Table, according to IUPAC conventions.

In one or more embodiments, the metathesis catalyst includes a ruthenium-based or osmium-based metathesis catalyst. Any ruthenium-based or osmium-based metathesis catalyst that is effective for metathesis polymerization reactions can be used. Advantageously, certain ruthenium and/or osmium-based catalysts are unaffected or only immaterially affected by the presence of certain advantageous functional groups present on the alkene.

In one embodiment, the ruthenium-based or osmium-based metathesis catalysts includes carbene complexes of the type sometimes referred to as Grubbs catalysts. Grubbs metathesis catalysts are described in U.S. Pat. Nos. 5,312,940, 5,342,909, 5,831,108, 5,969,170, 6,111,121, 6,211,391, 6,624,265, 6,696,597 and U.S. Published App. Nos. 2003/0181609 A1, 2003/0236427 A1, and 2004/0097745 A9, all of which are incorporated herein by reference.

Ru- or Os-based metathesis catalysts include compounds that can be represented by the formula

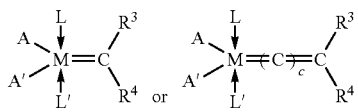 or 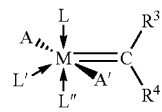

where M includes ruthenium or osmium, L and L' each independently include any neutral electron donor ligand, A and A' each independently include an anionic substituent, $R^3$ and $R^4$ independently comprise hydrogen or an organic group, and includes an integer from 0 to about 5, or where two or more of $R^3$, $R^4$, L, L', A, and A' combine to form a bidentate substituent.

In one embodiment, L and L' independently include phosphine, sulfonated phosphine, phosphite, phosphinite, phosphonite, arsine, stibnite, ether, amine, amide, imine, sulfoxide, carboxyl, nitrosyl, pyridine, thioether, trizolidene, or imidazolidene groups, or L and L' may together include a bidentate ligand. In one embodiment, L and/or L' include an imidizolidene group that can be represented by the formulas

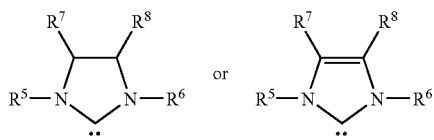

where $R^5$ and $R^6$ independently include alkyl, aryl, or substituted aryl. In one embodiment, $R^5$ and $R^6$ independently include substituted phenyls, and in another embodiment, $R^5$ and $R^6$ independently include mesityl. In one embodiment, $R^7$ and $R^8$ include alkyl or aryl, or form a cycloalkyl, and in another embodiment, are both hydrogen, t-butyl, or phenyl groups. Two or more of $R^5$, $R^6$, $R^7$ and $R^8$ can combine to form a cyclic moiety. Examples of imidazolidine ligands include 4,5-dihydro-imidazole-2-ylidene ligands.

In one embodiment, A and A' independently include halogen, hydrogen, $C_1$-$C_{20}$ alkyl, aryl, $C_1$-$C_{20}$ alkoxide, aryloxide, $C_2$-$C_{20}$ alkoxycarbonyl, arylcarboxylate, $C_1$-$C_{20}$ carboxylate, arylsulfonyl, $C_1$-$C_{20}$ alkylsulfonyl, $C_1$-$C_{20}$ alkylsulfinyl, each ligand optionally being substituted with $C_1$-$C_5$ alkyl, halogen, $C_1$-$C_5$ alkoxy, or with a phenyl group that is optionally substituted with halogen, $C_1$-$C_5$ alkyl, or $C_1$-$C_5$ alkoxy, and A and A' together may optionally include a bidentate ligand.

In one embodiment, $R^3$ and $R^4$ include groups independently selected from hydrogen, $C_1$-$C_{20}$ alkyl, aryl, $C_1$-$C_{20}$ carboxylate, $C_1$-$C_{20}$ alkoxy, aryloxy, $C_1$-$C_{20}$ alkoxycarbonyl, $C_1$-$C_{20}$ alkylthio, $C_1$-$C_{20}$ alkylsulfonyl and $C_1$-$C_{20}$ alkylsulfinyl, each of $R^3$ and $R^4$ optionally substituted with $C_1$-$C_5$ alkyl, halogen, $C_1$-$C_5$ alkoxy or with a phenyl group that is optionally substituted with halogen, $C_1$-$C_5$ alkyl, or $C_1$-$C_5$ alkoxy.

In one embodiment, L or L' and A or A' may combine to form one or more bidentate ligands. Examples of this type of complex are described as Class II catalysts in U.S. Pat. No. 6,696,597. In another embodiment, $R^3$ or $R^4$ and L or L' or A or A' may combine to form one or more bidentate ligands. This type of complex is sometimes referred to as Hoveyda or Hoveyda-Grubbs catalysts. Examples of bidentate ligands that can be formed by $R^3$ or $R^4$ and L or L' include ortho-alkoxyphenylmethylene ligands.

Other useful catalysts include hexavalent carbene compounds including those represented by the formula where M includes ruthenium or osmium, L, L', L" each independently include any neutral electron donor ligand, A, A', and A" each independently include an anionic substituent, and $R^3$ and $R^4$ independently comprise hydrogen or an organic group. In a manner similar to the penta-valent catalysts described above, one or more of the substituents in the hexa-valent complex may combine to form a bidentate substituent.

Examples of ruthenium-based carbene complexes include ruthenium, dichloro(phenylmethylene)bis(tricyclohexylphosphine), ruthenium, dichloro(phenylmethylene)bis(tricyclopentylphosphine), ruthenium, dichloro(3-methyl-2-butenylidene)bis(tricyclohexylphosphine), ruthenium, dichloro(3-methyl-2-butenylidene)bis(tricyclopentylphosphine), ruthenium, dichloro(3-phenyl-2-propenylidene)bis(tricyclohexylphosphine), ruthenium, dichloro(3-phenyl-2-propenylidene)bis(tricyclopentylphosphine), ruthenium, dichloro(ethoxymethylene)bis(tricyclohexylphosphine), ruthenium, dichloro(ethoxymethylene)bis(tricyclopentylphosphine), ruthenium, dichloro(t-butylvinylidene)bis(tricyclohexylphosphine), ruthenium, dichloro(t-butylvinylidene)bis(tricyclopentylphosphine), ruthenium, dichloro(phenylvinylidene)bis(tricyclohexylphosphine), ruthenium, dichloro(phenylvinylidene)bis(tricyclopentylphosphine), ruthenium,[2-(((2,6-bismethylethyl)-4-nitrophenyl)imino-kN)methyl-4-nitrophenolato-kO)]chloro-(phenylmethylene) (tricyclohexylphosphine), ruthenium,[2-(((2,6-bismethylethyl)-4-nitrophenyl)imino-kN)methyl-4-nitrophenolato-kO)]chloro-(phenylmethylene)(tricyclopentylphosphine), ruthenium,[2-(((2,6-bismethylethyl)-4-nitrophenyl)imino-kN)methyl-4-nitrophenolato-kO)]chloro-(3-methyl-2-butenylidene)(tricyclohexylphosphine), ruthenium,[2-(((2,6-bismethylethyl)-4-nitrophenyl)imino-kN)methyl-4-nitrophenolato-kO)]chloro-(3-methyl-2-butenylidene) (tricyclopentylphosphine), ruthenium,[1,3-bis-(2,4,6-trimethylphenyl)-2-imidazolidinylidene][2-(((2,6-bismethylethyl)-4-nitrophenyl)imino-kN)methyl-4-nitrophenolato-kO)]chloro-(phenylmethylene), ruthenium, [1,3-bis-(2,4,6-trimethylphenyl)-2-imidazolidinylidene][2-(((2,6-bismethylethyl)-4-nitrophenyl)imino-kN)methyl-4-nitrophenolato-kO)]chloro-(3-methyl-2-butenylidene), ruthenium, dichloro[1,3-dihydro-1,3-bis-(2,4,6-trimethylphenyl)-2H-imidazol-2-ylidene](phenylmethylene)(tricyclohexylphosphine), ruthenium, dichloro[1,3-dihydro-1,3-bis-(2,4,6-trimethylphenyl)-2H-imidazol-2-ylidene] (phenylmethylene)(tricyclopentylphosphine), ruthenium, dichloro[1,3-dihydro-1,3-bis-(2,4,6-trimethylphenyl)-2H-imidazol-2-ylidene](3-methyl-2-butenylidene)(tricyclohexylphosphine), ruthenium, dichloro[1,3-dihydro-1,3-bis-(2,4,6-trimethylphenyl)-2H-imidazol-2-ylidene](3-methyl-2-butenylidene)(tricyclopentylphosphine), ruthenium, dichloro[1,3-dihydro-1,3-bis-(2,4,6-trimethylphenyl)-2H-imidazol-2-ylidene](3-phenyl-2-propenylidene)(tricyclohexylphosphine), ruthenium, dichloro[1,3-dihydro-1,3-bis-(2,4,6-trimethylphenyl)-2H-imidazol-2-ylidene](3-phenyl-2-propenylidene)(tricyclopentylphosphine), ruthenium, dichloro[1,3-dihydro-1,3-bis-(2,4,6-trimethylphenyl)-2H-imidazol-2-ylidene](ethoxymethylene)(tricyclohexylphosphine), ruthenium, dichloro[1,3-dihydro-1,3-bis-(2,4,6-trimethylphenyl)-2H-imidazol-2-ylidene](ethoxymethylene)

(tricyclopentylphosphine), ruthenium, dichloro[1,3-dihydro-1,3-bis-(2,4,6-trimethylphenyl)-2H-imidazol-2-ylidene](t-butylvinylidene)(tricyclohexylphosphine), ruthenium, dichloro[1,3-dihydro-1,3-bis-(2,4,6-trimethylphenyl)-2H-imidazol-2-ylidene](t-butylvinylidene)(tricyclopentylphosphine), ruthenium, dichloro[1,3-dihydro-1,3-bis-(2,4,6-trimethylphenyl)-2H-imidazol-2-ylidene](phenylvinylidene)(tricyclohexylphosphine), ruthenium, dichloro[1,3-dihydro-1,3-bis-(2,4,6-trimethylphenyl)-2H-imidazol-2-ylidene](phenylvinylidene)(tricyclopentylphosphine), ruthenium,[1,3-bis-(2,4,6-trimethylphenyl)-2-imidazolidinylidene]dichloro(phenylmethylene)(tricyclohexylphosphine), ruthenium,[1,3-bis-(2,4,6-trimethylphenyl)-2-imidazolidinylidene]-dichloro(phenylmethylene)(tricyclopentylphosphine), ruthenium,dichloro[1,3-bis-(2,4,6-trimethylphenyl)-2-imidazolidinylidene](3-methyl-2-butenylidene)(tricyclohexylphosphine), ruthenium,dichloro[1,3-bis-(2,4,6-trimethylphenyl)-2-imidazolidinylidene] (3-methyl-2-butenylidene)(tricyclopentylphosphine), ruthenium,dichloro[1,3-bis-(2,4,6-trimethylphenyl)-2-imidazolidinylidene](3-phenyl-2-propylidene)(tricyclohexylphosphine), ruthenium, dichloro[1,3-bis-(2,4,6-trimethylphenyl)-2-imidazolidinylidene](3-phenyl-2-propylidene)(tricyclopentylphosphine), ruthenium,[1,3-bis-(2,4,6-trimethylphenyl)-2-imidazolidinylidene]-dichloro(ethoxymethylene)(tricyclohexylphosphine), ruthenium,[1,3-bis-(2,4,6-trimethylphenyl)-2-imidazolidinylidene]-dichloro(ethoxymethylene)(tricyclopentylphosphine), ruthenium,[1,3-bis-(2,4,6-trimethylphenyl)-2-imidazolidinylidene]-dichloro(t-butylvinylidene)(tricyclohexylphosphine), ruthenium,[1,3-bis-(2,4,6-trimethylphenyl)-2-imidazolidinylidene]-dichloro(t-butylvinylidene)(tricyclopentylphosphine), ruthenium,[1,3-bis-(2,4,6-trimethylphenyl)-2-imidazolidinylidene]-dichloro(phenylvinylidene)(tricyclohexylphosphine), and ruthenium,[1,3-bis-(2,4,6-trimethylphenyl)-2-imidazolidinylidene]-dichloro(phenylvinylidene)(tricyclopentylphosphine).

Commercially available Ru-based metathesis catalysts include ruthenium, dichloro(phenylmethylene)bis(tricyclohexylphosphine) (sometimes referred to as Grubbs First Generation Catalyst), ruthenium,[1,3-bis-(2,4,6-trimethylphenyl)-2-imidazolidinylidene]dichloro(phenylmethylene)(tricyclohexylphosphine) (sometimes referred to as Grubbs Second Generation Catalyst), ruthenium, dichloro[[2-(1-methylethoxy)phenyl]methylene](tricyclohexylphosphine), (sometimes referred to as Hoveyda-Grubbs First Generation Catalyst), and ruthenium,[1,3-bis(2,4,6-trimethylphenyl)-2-imidazolidinylidene]dichloro[[2,(1-methylethoxy)phenyl]methylene], (sometimes referred to as Hoveyda-Grubbs Second Generation Catalyst). These Ru-based metathesis catalysts are available from Materia Inc. (Pasadena, Calif.).

In one embodiment, the Ru-based or Os-based metathesis catalyst can be prepared in situ. For example, a Ru or Os compound can be combined with an alkyne and an appropriate ligand under known conditions to form a metal carbene complex such as those described above.

Other metathesis catalysts that are also useful include tungsten and/or molybdenum-based metathesis catalysts. These catalysts include those that may be formed in situ from salts such as tungsten salts, and molybdenum and tungsten complexes known as Schrock's carbenes. Additionally, supported systems can be used, especially where gas-phase polymerization is employed. Tungsten-based metathesis catalysts are further described in U.S. Pat. Nos. 3,932,373, and 4,391,737, and Schrock catalysts are described in U.S. Pat. Nos. 4,681,956, 5,087,710, and 5,142,073, all of which are incorporated herein by reference.

3. Monomer

In one or more embodiments, useful olefin monomers include those that will undergo a metathesis reaction, i.e. those that include at least one metathesis-active double bond. The cycloolefins may be a cycloalkene or a cyclopolyene. Suitable examples of acyclic monomers include dienes, alpha omega dienes, oligomers of olefins, and the like.

In certain embodiments, the olefin is a mixture of two or more different olefins that differ in at least one aspect such as the number of carbon atoms or heteroatoms and the amount and kind of substituents. Two or more different olefins may also refer to two or more olefinic isomers. In one embodiment, the ratio of first olefin to second olefin is from about 99:1 to 1:99, in another embodiment from about 95:5 to 5:95, and yet another embodiment from about 90:10 to 1:90. In the instance where ROMP is used, the cycloolefin includes a mixture of two or more cycloolefins that differ in ring size or in substituents, or a mixture of two or more isomers of cycloolefins. Any combination of two or more cycloolefins can be used that provides the desired polymer properties, as discussed below. In one embodiment, the mixture includes 1,5-cyclooctadiene and cyclopentene, or in other embodiments 1,5-cyclooctadiene and cyclooctene.

Any cycloolefin that can participate in a ring-opening metathesis polymerization (ROMP) reaction may be used. The cycloolefin may include one or more substituent groups and/or functional groups. The cycloolefin may be a cycloalkene or a cyclopolyene.

Cycloolefins include compounds represented by the formula

where z includes an integer from 1 to about 18. Examples of cycloolefins include cyclopropene, cyclobutene, benzocyclobutene, cyclopentene, dicyclopentadiene, norbornene, norbornadiene, cycloheptene, cyclooctene, 7-oxanorbornene, 7-oxanorbornadiene, cyclodecene, 1,3-cyclooctadiene, 1,5-cyclooctadiene, 1,3-cycloheptadiene, [2.2.1]bicycloheptenes, [2.2.2]bicyclooctenes, cyclohexenylnorbornenes, norbornene dicarboxylic anhydrides, cyclododecene, 1,5,9-cyclododecatriene, and derivatives thereof. It will be recognized by those of skill in the art that the thermodynamics of ring-opening polymerization varies based upon factors such as ring size and substituents. Ring-opening metathesis is described in K. J. Ivin and J. C. Mol, *Olefin Metathesis and Metathesis Polymerization*, Chap. 11 (1997), which is hereby incorporated by reference.

An alkene including a functional group must be present. The functional alkene, which may also be referred to as a functionalizing agent, includes at least one metathesis-active double bond. The acyclic alkene includes functional end-groups. The above may be represented by the formula

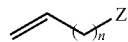

where Z includes a functional group and n includes an integer from 0 to about 20. A mixture of two or more functionalized alpha olefins may be used.

The acyclic functional alkene can be represented by the formula

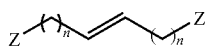

where each Z, which may be the same or different, is a functional group and n is an integer from 0 to about 20, in another embodiment, n is an integer from about 1 to about 9, in yet another embodiment, n is an integer less than about 6.

5. Synthesis

The synthetic techniques employed to prepare the unsaturated metathesis interpolymers having at least one or more terminal functional groups employed in the present invention include conventional metathesis polymerization techniques. These reactions may include ring-opening metathesis polymerization (ROMP) and/or acyclic diene metathesis polymerization (ADMET); these reactions are known in the art as set forth in U.S. Pat. Nos. 5,728,917 and 5,290,895, and 5,969,170, which are incorporated herein by reference. Metathesis polymers can also be prepared by the metathesis depolymerization of higher molecular weight unsaturated polymers (see WO2006/127483 A1). The use of functional alkenes, including multi-functional alkenes, in metathesis reaction, is also known as disclosed as U.S. Pat. No. 5,880,231 and U.S. Ser. No. 11/344,660, which are incorporated herein by reference.

In one or more embodiments, the reactants and catalysts are introduced in an inert atmosphere. The order of reactant or catalyst addition is not particularly limited. In one embodiment, the functional alkene and two or more metathesis-active olefin monomers are combined to form a mixture, and then the metathesis catalyst is added to the mixture. One or more of the materials may be introduced together with a solvent. In other embodiments, the monomer or mixtures of monomers may first be polymerized followed by the addition of the functionalized alkene.

Metathesis polymerization reactions typically occur at temperatures that are below the ceiling temperature of the monomers. The ceiling temperature is the temperature above which polymerization does not occur to an appreciable extent. In one embodiment, the metathesis reaction occurs at a temperature of from minus 40° C. to about 100° C., in another embodiment, the temperature is from about minus 20° C. to about 75° C., in yet another embodiment, the temperature is from about 0° C. to about 55° C.

The progress of the reaction can optionally be monitored by standard analytical techniques, as for the alkene preparation, or by monitoring the percent solids. The metathesis reaction may optionally be terminated by adding a catalyst deactivator, such as ethyl vinyl ether.

After reaction, the metathesis-polymerized polymer may be isolated from the solvent using conventional procedures. In one or more embodiments, especially where the functional groups are sensitive to water, known techniques can be used to prevent or diminish contact with water.

In producing a functional polymer, the amount of acyclic alkene and monomers that are employed in the metathesis reaction is not particularly limited. Advantageously, the molar ratio of the acyclic alkene to the monomers can be selected to adjust the molecular weight of the polymer. For example, a molecular weight of about 1 kg/mol to about 10 kg/mol can be obtained when the molar ratio of acyclic alkene to the monomers is from about 1:9 to about 1:150.

The relative amount of each monomer is not particularly limited. In one embodiment, the ratio of first monomer to second monomer is from about 99:1 to about 1:99, in another embodiment, the ratio of first monomer to second monomer is from about 95:5 to about 5:95, in yet another embodiment, the ratio of first monomer to second monomer is from about 90:10 to about 10:90.

The amount of metathesis catalyst employed in the metathesis reaction is not critical, however a catalytic amount of catalyst is typically employed. In one embodiment, the amount of catalyst is at least about 0.1 mmol catalyst per 100 moles olefin, in other embodiments at least about 1 mmol catalyst per 100 moles olefin, in other embodiments, the amount of catalyst is from about 5 mmol to about 10 moles catalyst per 100 moles olefin, and still other embodiments from about 10 mmol to about 1 moles catalyst per 100 moles olefin, and yet another embodiment about 0.02 to about 0.5 moles catalyst per 100 moles olefin.

In other embodiments, metathesis catalysis can be employed in conjunction with existing high molecular weight metathesis polymers to form the desired interpolymers of this invention. In other words, metathesis catalysis can be employed to prepare polymer of a desired molecular weight by introducing the catalyst to high molecular weight polymer and alkene. The high molecular weight polymer that can be used in this process includes high molecular weight polymer produced by metathesis polymerization. For example, high molecular weight polymer resulting from the polymerization of cyclooctene having a molecular weight of about 90 kg/mole, less than 1% pendant vinyl, and about 12-15 double bonds per 100 carbon atoms in the polymer chain are commercially available under the tradename Vestenamer™ (Degussa). These polymers can be contacted with a metathesis catalyst and an alkene to produce a lower molecular weight metathesis polymer. Also, by employing functionalized alkenes, the resulting metathesis polymer can be functionalized. Optionally, a cycloolefin or diene containing a metathesis-reactive double bond can be added to copolymerize with the base polymer and thereby form an interpolymer having at least one or more terminal functional groups.

6. Characteristics of Unsaturated Polymer a. Pendant Vinyl Content

In one or more embodiments, the unsaturated metathesis interpolymer having at least one or more terminal functional groups employed in the present invention may be characterized by a relatively low pendant vinyl content. Pendant vinyl group refers to an alkenyl group along the polymer backbone with one point of attachment to the backbone exclusive of a terminal end grouping one or more embodiments, the interpolymer may include less than about 2%, in other embodiments less than about 1%, in other embodiments less than about 0.5%, and in other embodiments less than about 0.05% of vinyl groups. In one or more embodiments, the unsaturated polymer is substantially devoid of pendant vinyl units where substantially devoid includes that amount or less pendant vinyl units that would otherwise have an appreciable impact on the polymer. In one or more embodiments, the unsaturated polymer is devoid of pendant vinyl groups.

b. Glass Transition Temperature ($T_g$)

In one or more embodiments, the $T_g$ of the unsaturated metathesis interpolymer having at least one or more terminal functional groups may be less than about 0° C., in other embodiments less than about minus 10° C., and in yet other embodiments less than about minus 15° C. In still another embodiment, the $T_g$ may be from about minus 15 to about minus 115° C.

c. Melting Temperature ($T_m$)

In one or more embodiments, the melting point of the unsaturated interpolymer having at least one or more terminal functional groups may be from about minus (−) 40° C. to about (+) 50° C., in other embodiments from about minus 35° C. to about 40° C., and in yet other embodiments from about minus 30° C. to about 20° C.

The melting point of the polymer can be controlled by selecting the relative amounts of monomers. For example, the melting point of a copolymer prepared from cyclooctadiene and cyclopentene may vary from about minus (−) 30° C. to about (+) 40° C. as the mole fraction of pentene units in the copolymer decrease from about 0.3 to about zero percent, based upon the total moles of cyclooctadiene and cyclopentene.

d. Number Average Molecular Weight ($M_n$)

In one or more embodiments, the unsaturated polymer having at least one or more terminal functional groups may be characterized by a number average molecular weight ($M_n$) of at least about 0.5 kg/mole, in other embodiments at least about 1 kg/mole, in other embodiments at least about 1.5 kg/mole, and in other embodiments at least about 2.0 kg/mole. In one or more embodiments, the unsaturated polymer may be characterized by a number average molecular weight of less than about 100 kg/mole, in other embodiments less than about 80 kg/mole, in other embodiments less than about 60 kg/mole, and in other embodiments less than 40 kg/mole and in another embodiment, less than about 20 kg/mole. In one or more embodiments, the unsaturated polymer may be characterized by a molecular weight distribution (Mw/Mn) of from about 1.05 to about 2.5, in other embodiments from about 1.1 to about 2.0, and in other embodiments from about 1.2 to about 1.8. Molecular weight may be determined by using standard GPC techniques with polystyrene standards.

e. Double Bond Content

In one or more embodiments, the methathesis interpolymer having at least one or more terminal functional groups may be characterized by relatively low unsaturation. In one or more embodiments, the metathesis interpolymer contains from about 5 to about 25 double bonds per 100 carbon atoms, in other embodiments, the metathesis polymer contains from about 6 to about 20 double bonds per 100 carbon atoms, in other embodiments from about 7 to about 18 double bonds per 100 carbon atoms, and in other embodiments, the metathesis polymer contains from about 10 to about 15 double bonds per 100 carbon atoms in the polymer.

g. Microstructure

The metathesis polymers herein have a cis content of about greater than 10%; and in another embodiment, greater than 30%, and in another embodiment, greater than 50%.

In one embodiment, the metathesis interpolymers of the present invention having at least one or more terminal functional groups may be used to provide compositions with aromatic polyesters. The compositions can be prepared by mixing or blending of an aromatic polyester resin and the metathesis polymer having at least one or more terminal functional groups herein. Techniques for mixing are known in the art, and this invention is not limited to the selection of a particular method. In one embodiment, the mixing occurs in a reactive extruder such as a twin-screw extruder.

The novel metathesis interpolymers have utility in many fields, including use in impact modification, compatibilizing agents, additives to control viscosity of associated polymers, and to give smooth molded surfaces. The reactive sites of the interpolymer can also be used for subsequent chemical reactions to prepare materials useful in oxygen scavenging.

2. In order to demonstrate the practice of the present invention, the following examples have been prepared and tested. The examples should not, however, be viewed as limiting the scope of the invention. The claims will serve to define the invention.

EXAMPLE

Synthesis of telechelic, low molecular weight cyclooctene-1,5-cyclooctadiene copolymer In a 1-gallon volume stainless steel reactor, a batch mixture was charged consisting of 1185 mL (996 g, 9.0 mol) of degassed cyclooctene, 560 mL (497 g, 4.6 mol) degassed 1,5-cyclooctadiene, and 60 mL (65.5 g, 0.38 mol) degassed cis-1,4-diacetoxy-2-butene. The mixture was stirred and heated to 50° C. A solution of 0.42 g (0.50 mmol) Grubbs' $2^{nd}$ generation ruthenium metathesis catalyst in 10 mL dry, degassed toluene was prepared under inert atmosphere and added to the monomer mixture. Within 1 minute, an increase in reaction temperature began to occur, with the peak temperature reaching 114° C. within 15 minutes. The reaction was stirred for 2 hours, after which a solution of 10 mL ethyl vinyl ether in hexanes was added to deactivate the metathesis catalyst. After stirring for 30 minutes, the polymer was dropped into bottles for storage and analyzed. The product polymer was an amber colored oily liquid. The resulting material had the following characteristics: $M_n$=9.2 kg/mol; $M_w/M_n$=1.82; 67/33 trans/cis olefin content; 48/52 mole ratio octenyl/butenyl units.

Various modifications and alterations that do not depart from the scope and spirit of this invention will become apparent to those skilled in the art. This invention is not to be duly limited to the illustrative embodiments set forth herein.

What is claimed is:

1. A copolymer produced by metathesis polymerization of two distinct monomer, where the two monomer include (i) 1,5-cyclooctadiene and cyclopentene, (ii) 1,5-cyclooctadiene and cyclooctene, or (iii) cyclooctene and cyclopentene, where the copolymer includes at least one or more terminal functional groups selected from the group consisting of hydroxyl, carboxylic acid, ester, carbonate, cyclic carbonate, anhydride, cyclic anhydride, lactone, amine, amide lactam, cyclic ether, ether, aldehyde, thiazoline, oxazoline, phenol, and melamine functional groups, where the copolymer includes less than about 2% pendant vinyl groups, from about 5 to about 25 double bonds per 100 carbon atoms, and has a cis content that is greater than 10%.

2. The copolymer of claim 1, wherein the terminal functional group is selected from the group consisting of hydroxyl, carboxylic acid, and ester groups, and mixtures thereof.

3. The copolymer of claim 2, wherein the terminal functional group is hydroxyl group.

4. The copolymer of claim 2, wherein the terminal functional group is carboxylic acid group.

5. The copolymer of claim 2, wherein the terminal functional group is ester group.

6. The copolymer of claim 1, wherein the double bond content ranges from about 6 to about 20 double bonds per 100 carbon atoms.

7. The copolymer of claim 6, wherein the double bond content ranges from about 7 to about 18 double bonds per 100 carbon atoms.

8. The copolymer of claim 7, wherein the double bond content ranges from about 10 to about 15 double bonds per 100 carbon atoms.

9. The copolymer of claim 1, wherein the interpolymer is 1,5-cyclooctadiene and cyclopentene.

10. The copolymer of claim 1, wherein the interpolymer is 1,5-cyclooctadiene and cyclooctene.

11. The copolymer of claim 1, wherein the interpolymer is cyclooctene and cyclopentene.

12. A copolymer comprising:
(i) units deriving from the polymerization of at least two monomer selected from the group consisting of 1,5-cyclooctadiene, cyclooctene, and cyclopentene; and
(ii) at least one terminal functional group including a hydroxy, carboxylic acid, ester, carbonate, cyclic carbonate, anhydride, cyclic anhydride, lactone, amine, amide lactam, cyclic ether, ether, aldehyde, thiazoline, oxazoline, phenol, and melamine functional groups, where the copolymer is prepared by metathesis polymerization, and where the copolymer has less than 2% vinyl groups, a glass transition temperature of less than about 0° C., an $M_n$ of at least about 0.5 kg/mole and less than 100 kg/mole, from about 5 to about 25 double bonds per 100 carbon atoms, and a cis content greater than 10%.

13. The copolymer of claim 12, where the copolymer is a linear copolymer having functional groups at each terminal end.

14. The copolymer of claim 12, where the copolymer consists essentially of units deriving from the polymerization of 1,5-cyclooctadiene and cyclooctene or cyclopentene, and said at least one terminal functional group.

15. The copolymer of claim 12, where the copolymer consists essentially of units deriving from the polymerization of cyclooctene and cyclopentene, and said at least one terminal functional group.

* * * * *